INVENTOR.
Vernon R. Helton
BY  J.C. Evans
His Attorney

INVENTOR.
Vernon R. Helton
BY J.C. Evans
His Attorney

United States Patent Office 3,330,049
Patented July 11, 1967

3,330,049
CLOTHES DRYER DRIVE BELT TENSIONER
Vernon R. Helton, Franklin, Ohio, assignor to General Motors Corporation, Detroit, Mich., a corporation of Delaware
Filed May 24, 1965, Ser. No. 457,965
1 Claim. (Cl. 34—139)

ABSTRACT OF THE DISCLOSURE

In preferred form, a clothes dryer drive system for operating a rotatable tumbling drum including a continuous belt passing around the outer periphery of the drum and a drive motor pulley, an idler pulley assembly including a compensating link supported with respect to and biased against the continuous belt to prevent slip between the motor pulley and the belt by compensating for belt slack while preventing the continuous belt from pinching the drive motor sheave.

---

This invention relates to clothes dryers and more particularly to clothes dryer drive systems.

In a domestic clothes dryer of the type including a rotatable tumbling drum, one proposed system for driving the drum is of the type wherein a single continuous belt is passed over the outer periphery of the drum and across a drive sheave operatively connected to a high-speed motor. In such systems, the drum diameter serves to produce a desired reduction in the speed of the drive motor whereby the drum is rotated in a range to produce a predetermined tumbling action of clothes within the drum interior. To compensate for load variations and for slack in the continuous belt, the systems additionally include an idler pulley component.

An object of the present invention is to improve tumbling drum drive systems of the type including a single continuous drive belt passed over the outer periphery of a tumbling drum, a drive sheave, and over a portion of the outer periphery of a compensating idler pulley by the provision of an improved bracket system for commonly supporting the motor and the compensating idler pulley and including means for adjustably supporting the idler pulley to continuously compensate for changes in the driven load and slack built up in the continuous belt.

A further object of the present invention is to improve rotatable tumbling drum drive systems of the type including a single continuous drive belt passed in driving engagement over the outer periphery of a tumbling drum, a drive sheave and an idler pulley by the provision of an improved idler pulley support arrangement including a biased compensating link that continuously directs the belt over the drive sheave through a wrap to prevent slip between the belt and the drive sheave and to prevent any tendency for the continuous belt to be biased against itself.

A further object of the present invention is to improve rotatable tumbling drum drive systems of the type wherein a single continuous drive belt is passed in driving engagement over the outer periphery of the rotatable drum, a motor driven drive sheave and an idler pulley by the provision of an improved idler support system including a bracket common to the motor support bracket and a compensating link for rotatably supporting the idler pulley and directing the idler pulley with respect to the drive sheave to compensate for slack therein while continuously maintaining said belt through substantially a 180° wrap around said drive sheave.

Further objects and advantages of the present invention will be apparent from the following description, reference being had to the accompanying drawings wherein a preferred embodiment of the present invention is clearly shown.

Figure 1:
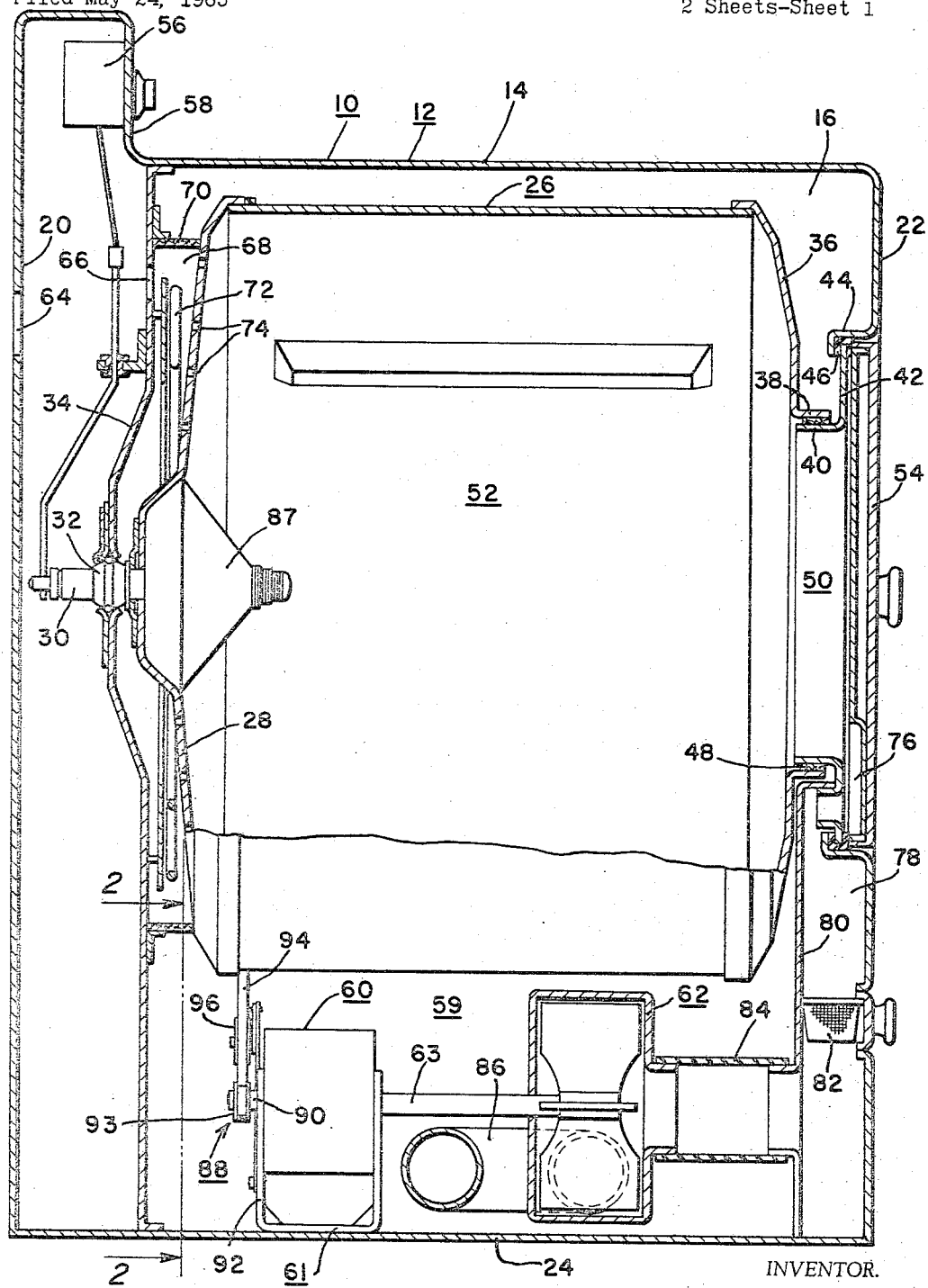
Figure 2:
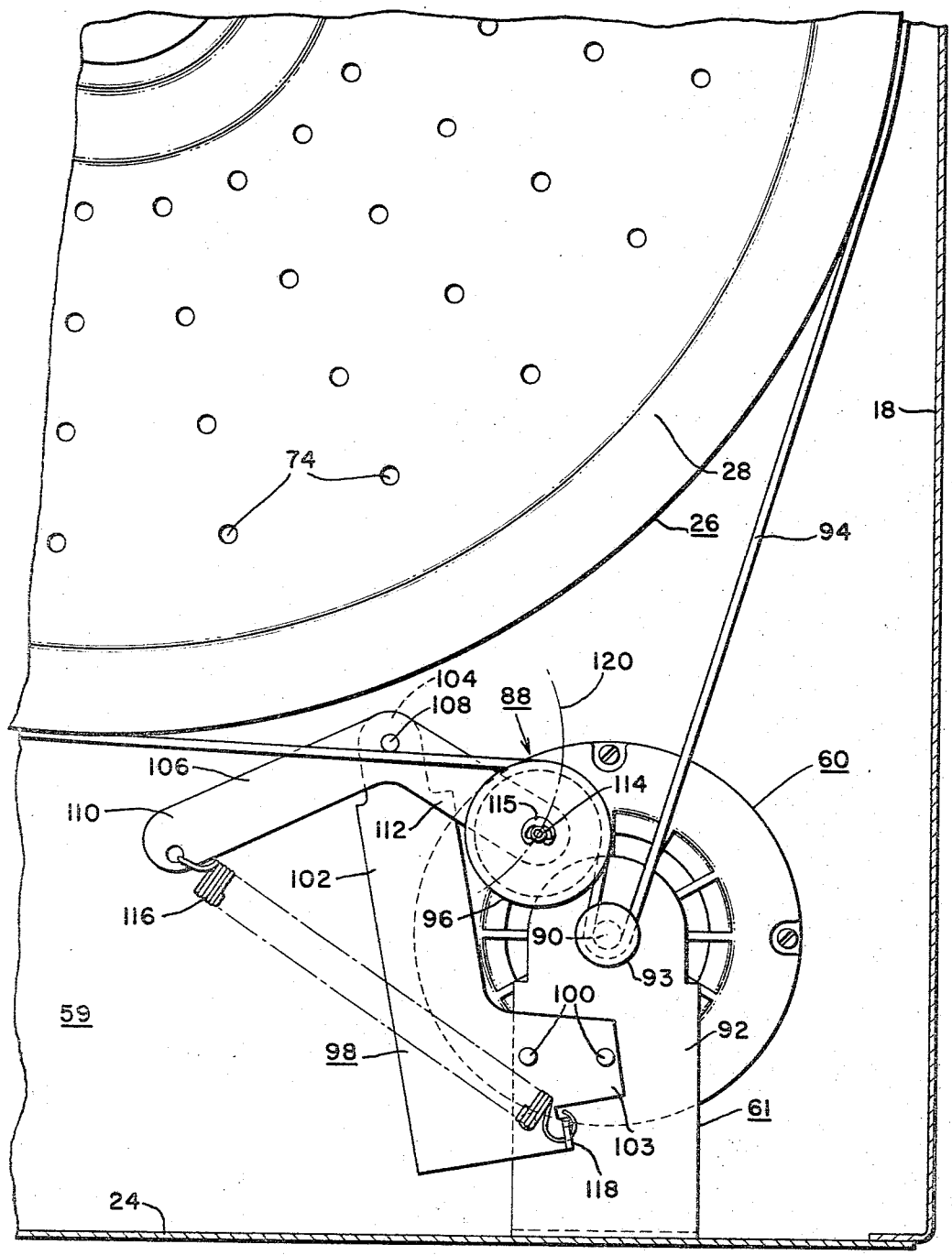

In the drawings:
FIGURE 1 is a view in vertical section through a domestic dryer including the drive system of the present invention; and
FIGURE 2 is an enlarged fragmentary view in vertical section taken along the line 2—2 of FIGURE 1.

Referring now to FIGURE 1 a domestic dryer 10 is illustrated including an outer casing 12 having a top 14, side walls 16, 18, a rear wall 20, a front wall 22 and a base 24. Within casing 12 is located a rotatable tumbling drum 26 having the rear wall 28 thereof secured to a shaft member 30 including a universal bearing 32 rotatably supported in a rear bulkhead 34 directed from the top 14 of the outer casing 12 to the base 24 thereof between the side walls 16, 18. A front wall 36 of the tumbling drum 26 has an outwardly directed annular flange 38 thereon which is concentrically disposed radially outwardly of an inwardly directed flange 40 on an annular supporting collar 42 supportingly received on an inwardly directed flange 44 of the front wall 22 and sealed with respect thereto by an annular sealing member 46. The collar flange 40 has a plurality of bearing blocks 48 thereon that support the flange 38. The collar 42 defines an access opening 50 to the interior 52 of the drum 26 which is closed by a door closure member 54 pivotally secured to the front wall 22.

In the illustrated arrangement the dryer 10 includes a controller 56 located on a control panel 58 formed between the top 14 and rear wall 20 for sequentially controlling the operation of the dryer.

In a machinery compartment 59 within the casing 12 beneath the drum 26 is located a drive motor 60 that is secured to the base 24 by a bracket 61. The motor 60 is operatively connected to a blower 62 by a shaft 63 for drawing air from exteriorly of the casing 12 through an opening 64 in the rear wall 20, an opening 66 in the bulkhead 34 thence into an inlet chamber 68 formed by the rear wall 28 of the drum 26, the bulkhead 34 and an annular sealing member 70 fixedly secured to the bulkhead 34 to be located in sliding, sealing engagement with the outer surface of the rear wall 28.

Within the inlet chamber 68 is located a heating element 72 for heating air passing outwardly thereof through openings 74 in the rear wall 28 and into the drum interior 52 where the heated air stream is directed across articles being tumbled therein for removing moisture therefrom. Air is directed from the drum interior 52 through the access opening 50 thence through a passageway 76 in the door closure member 54 and into a passageway 78 formed by a duct member 80 in conjunction with the outer wall 22 of the casing 12. The circulated air stream passes across a removable lint filter unit 82 and thence through a flexible conduit 84 connected to the inlet of the blower 62. Air is then discharged through a flexible conduit 86 exteriorly of the dryer casing 12.

Energization of the motor 64 for driving the blower 62 and concurrent energization of the heater 72 is in part controlled by a probe 87 located on the rear wall 28 of drum 26 to extend interiorly of the drum 26 so as to contact articles being tumbled therein. The probe 87, upon contacting clothes of a predetermined dryness, terminates dryer operation as more specifically set forth in copending United States application, Ser. No. 457,435, filed May 20, 1965.

In accordance with certain of the principles of the present invention, the drum 26 is driven by an improved single poly-V belt drive system 88, best seen in FIGURE 2 as including a rotatable drive shaft 90 directed outwardly of the outer end of the motor 60 through an upright member 92 of the motor bracket 61 that is spaced outwardly of the outer end of the motor 60. On the end of the drive shaft 90 is fixedly secured a drive sheave 93 over which is wrapped a single, continuous poly-V drive belt 94 that is directed upwardly from the sheave and across the outer periphery of the drum 26 adjacent the rear wall 28 thereof. The belt 94, after passing around substantially the full outer diameter of the drum 26, passes over a portion of the outer periphery of an idler pulley 96 thence back to the drive sheave 93.

In tumbling drum drive systems that include such a continuous drive belt passed over the periphery of the drum, one problem is that the substantial length of the belt can produce relatively great slack following periods of operation that must be continuously compensated to maintain a desired driving engagement of the belt 94 with the sheave 93. More particularly, to avoid slip between sheave 93 and the belt 94, it is desirable to maintain the belt 94 so as to be wrapped around the sheave 93 through substantially 180° as shown in FIGURE 2. Another problem in such arrangements is that of accurately locating the idler pulley with respect to the sheave during the assembly of the drive system. Accordingly, in the present invention, the idler pulley 96 is supported by a bracket member 98 representatively shown as being L-shaped and having a lower end fixedly secured by suitable means such as rivets 100 to the upright portion 92 of the motor bracket 61. By securing the idler pulley bracket 98 to the motor bracket any problem of misalignment between these brackets is eliminated.

In the illustrated arrangement the idler pulley bracket 98 includes an upwardly directed portion 102 offset substantially 90° to a riveted lower arm portion 103 and inclined away from the axis of rotation of the drive sheave 93. The arm 102 has an upper end portion 104 located thereon immediately below the outer periphery of the drum 26 at a point above the drive sheave 93. On the upper end portion 104 is pivotally supported a bellcrank compensating link 106 that has its center pivot pivotally secured to the end portion 104 by a pin 108 and includes an arm portion 110 on one side thereof and an arm portion 112 on the opposite side thereof directed downwardly on either side thereof from the center pivot point 108.

The idler pulley 96 is rotatably supported on the end of the arm 112 by a pin 114 and secured thereto by a snap ring 115. The end of the arm 110 is fastened to one end of a tension spring 116 which has its opposite end fastened through a tab portion 118 on the bracket arm 103.

The end portions of the arms 110, 112 define end pivot portions on the bellcrank 106 that are offset with respect to one another through a predetermined angle whereby the tension spring is operative to bias the idler pulley 96 upwardly toward the outer periphery of the drum 26 along an arc 120. The path of the arc 120 is such that the belt is continuously biased into driving engagement with the sheave 93 and substantially continuously directed about the sheave 93 through a wrap of approximately 180° to prevent any undesirable slip between the sheave 93 and the belt 94. Furthermore, the path of the arc 120 being directed upwardly and away from the portion of the belt 94 extending from the drive sheave 93 to the drum 26 prevents any pinching of the belt 94 around the drive sheave 93.

Thus, by virtue of the above-described arrangement, the idler pulley 96 will continuously compensate for changes in the driven load within the tumbling drum 26 by the tension spring 116 acting through the compensating bellcrank 106 to maintain a desired tension in the belt 94 irrespective of the load. Furthermore, as slack develops in the continuous belt 94, the desired wrap of the belt around the sheave 93 will be maintained as the idler pulley is biased along the arc 120 to maintain a desired driving engagement between the belt and the sheave and, furthermore, to prevent the belt from engaging itself in an undesirable manner.

While the embodiment of the present invention as herein disclosed constitutes a preferred form, it is to be understood that other forms might be adopted.

What is claimed is as follows:

In a domestic dryer, the combination of, an outer casing including a base, a tumbling drum located within said outer casing, means for supporting said drum for rotation with respect to said casing, a drive motor having an outer-end portion located adjacent the rear wall of said tumbling drum, a bracket for securing said motor to said base including an upright member disposed in spaced relationship to said outer end of said motor, a rotatable shaft directed from said motor through said bracket, a sheave fixed on the end of said shaft, an idler pulley support member secured to said upright member of said bracket including an upwardly directed portion thereon having its terminus located above said sheave, a bellcrank including a center pivot point, means for pivotally securing said center pivot point to said support member terminus, said bellcrank including a first arm on one side of said center pivot point and a second arm on the opposite side of said center pivot point, each of said first and second arms being inclined downwardly from said center pivot point, an idler pulley, means for rotatably securing said idler pulley on said first bellcrank arm between said center pivot and said sheave, a tension spring having one end thereof connected to said second bellcrank arm and the other end thereof connected to said idler pulley support member for causing movement of the axis of rotation of said idler pulley upwardly and away from the axis of rotation of said sheave, a continuous belt directed over the outer periphery of said drum, said idler pulley and said sheave to be driven by rotation of said motor shaft to rotate said drum, said bellcrank and pivot portions being offset with respect to one another to bias the center of rotation of said idler pulley along a predetermined arc for maintaining said belt wrapped about said sheave through approximately 180° during compensation by said idler pulley of slack in said continuous belt.

References Cited

UNITED STATES PATENTS

| | | | |
|---|---|---|---|
| 1,660,520 | 2/1928 | Nielsen et al. | 74—242.11 |
| 1,727,933 | 9/1929 | Mitchell | 74—242.11 |
| 2,110,439 | 3/1938 | Gordon | 74—242.11 |
| 2,663,195 | 12/1953 | Horan | 74—242.11 |
| 2,851,793 | 9/1958 | Thompson | 34—133 |
| 2,866,273 | 12/1958 | Geldhof | 34—133 X |
| 3,000,108 | 9/1961 | Jones et al. | 34—133 |
| 3,098,726 | 7/1963 | Stone | 34—133 |

FREDERICK L. MATTESON, Jr., *Primary Examiner.*

C. R. REMKE, *Assistant Examiner.*